United States Patent Office 3,432,495
Patented Mar. 11, 1969

3,432,495
ARYL HYDROXYALKYL ARSINIC ACIDS
AND SALTS THEREOF
Max Eugene Chiddix, Easton, Pa., and Edward Oliver Leonard, Bound Brook, N.J., assignors to GAF Corporation, a corporation of Delaware
No Drawing. Filed May 19, 1966, Ser. No. 551,214
U.S. Cl. 260—242                 11 Claims
Int. Cl. A01n 9/24; C07f 9/76

This invention relates to novel arsinic acid compounds having improved herbicidal activity.

Novel arsinic acid compounds falling within the purview of this invention are those having the general formula:

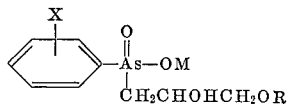

wherein X represents a member selected from the group consisting of hydrogen, halogen and lower alkoxy radicals; R represents a member selected from the group consisting of aryl, unsaturated alkyl, lower alkyl and haloaryl radicals and M represents a member selected from the group consisting of hydrogen, and a salt-forming moiety.

More particularly our invention pertains to arsinic acid derivatives of aryl hydroxyalkyl arsinic acid compounds useful as herbicides and having the general formula:

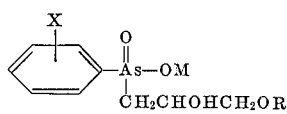

wherein X represents a member selected from the group consisting of hydrogen, ortho-, meta-, and para-chlorine and ortho-, meta-, and para-methoxy radicals; R represents a member selected from the group consisting of phenyl, 2,6-, 2,5-, 2,4- and 3,5-dichlorophenyl, methyl, ethyl, propyl, butyl, allyl and 2-propynyl radicals and M represents a member selected from the group consisting of hydrogen, an alkali metal, such as sodium, potassium, etc., an alkaline earth metal such as magnesium, calcium, barium, etc., an ammonium ion ($NH_4+$), and an amine salt such as a moiety from an amine such as methylamine, trimethylamine, triethylamine, ethanolamine, dibutylamine, ethylene diamine, morpholine, pyridine, and the like.

Certain arsinic compounds have found use as herbicides (U.S. 3,130,035). However, we have discovered a new, unobvious class of compounds having an exceptionally high and unexpected degree of effectiveness in their herbicidal activity. The above free acids and their salts are useful as herbicides and in particular as weed killers and defoliants. In a living plant, because of the effect of buffer salts the arsinic acid undoubtedly is converted to a salt during translocation. Moreover, the arsinic acids of this invention form double salts with rare earth chlorides, nitrates and sulfates, and hence, are also useful in the purification of rare earths.

The arsinic acid compounds of this invention are useful aganist all types of weeds and plants, including deciduous trees, vines, broadleaf plants, cereals, cotton, beans, and peas and may be applied at a rate equivalent to about between 0.1 pound to about 10 pounds per acre. Furthermore, it is immaterial as to how the subject arsinic compounds are applied, since applicants know of no reason that would bar their use by any known method.

Novel compounds of the instant invention may be prepared by reacting the salts of various arsenite compounds with alkylene oxides to form the arsinic acid salt which may be readily acidified to produce the corresponding free acids as illustrated by the following reaction:

(1)
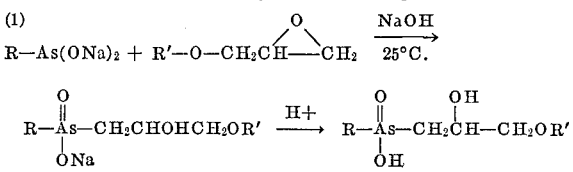

$$R-\overset{O}{\underset{\underset{ONa}{|}}{\overset{\|}{As}}}-CH_2CHOHCH_2OR' \xrightarrow{H+} R-\overset{O}{\underset{\underset{OH}{|}}{\overset{\|}{As}}}-CH_2\overset{OH}{\underset{|}{C}H}-CH_2OR'$$

wherein R represents phenyl, chlorophenyl or methoxyphenyl and R' represents phenyl, dichlorophenyl, lower alkyl, allyl or 2-propynyl.

The intermediate aryl starting materials used in the preparation of the subject compounds may be prepared according to the following known reactions:

(2) $As(ONa)_3 + X—C_6H_4N_2Cl \rightarrow$
$\qquad\qquad\qquad\qquad X—C_6H_4AsO(ONa)_2$ (3) $X—C_6H_4AsO(ONa)_2 + HCl + SO_2 \rightarrow$
$\qquad\qquad\qquad\qquad X—C_6H_4AsCl_2$ (4) $X—C_6H_4AsCl_2 + NaOH \rightarrow X—C_6H_4As(ONa)_2$ In the above reactions, 2 to 4, X represents a member selected from the group consisting of hydrogen, halogen and alkoxy radicals. Said reactions may be found more fully described in J. Am. Chem. Soc. 44, pages 805 and 1356 (1922).

It is obvious from reaction 1, depicted above, that an alkali metal salt of the arsinic acid is formed first and that the free acid can be obtained by acidification. Other salts, such as alkaline earth metal salts, the ammonium salt, an amine salt or other alkali metal salts may be prepared by neutralizing the free acid with the corresponding base. This does not depart from the scope of the instant invention, since the salt is merely a matter of choice.

As examples of the various alkali metal arylarsenite starting materials there may be mentioned sodium phenylarsenite, sodium o-, m-, p-chlorophenylarsenite, sodium o-, m-, p-methoxyphenylarsenite, potassium phenylarsenite, potassium o-, m-, and p-methoxyphenylarsenite and the like.

Examples of various bases which may be used to neutralize the arsinic acids are as follows: calcium hydroxide, calcium carbonate, magnesium hydroxide, barium hydroxide, lithium hydroxide, ammonium hydroxide, trimethylamine, triethylamine, methylamine, dimethylamine, ethanolamine, diethanolamine, triethanolamine, ethylene diamine, morpholine, piperadine, pyridine, imidazoline and quinoline.

In order to demonstrate the exceptional herbicidal activity of the instant subject compounds, we have performed the following test.

In a spray cabinet of Plexiglas having a bottom area of three square feet were placed pots containing plants of broadleaf species, i.e., Black Valentine Bean, Heavenly Blue Morningglory, Scarlet Globe Radish and Lincoln Soybean, along with cereal species, i.e., Clinton Oats and Rice, P. I. 8970. A spray solution was made up by dissolving 34 mg. of the test compound in 12.5 ml. of acetone or water containing 0.5% Tween 20. If not soluble, a fine suspension in water was used. Seven days after planting, 12 ml. of the spray solution were vertically directed evenly over the three square feet of area and on to the potted seedlings at a spray rate equivalent to 1 pound per acre. The spray was applied to twelve pots simultaneously (two pots of each species). Visual observations were then made of four plants of each broadleaf species (two plants per pot) and twenty plants of each cereal species (10 plants per pot). Said observations were made at intervals of two days; five days and ten to fourteen days after treatment.

The various test compounds were given a rating of from 1 to 4 with regard to their herbicidal activity on each plant and cereal species tested. A rating of 1 indicates discernable herbicidal activity. A rating of 2 indicates a slight, but not marked herbicidal effect. A rating of 3 indicates moderate or considerably injury to plant tissues. A rating of 4 indicates marked herbicidal activity characterized by killing or severe necrosis, defoliation, or other effects, which might lead to death before maturity. The maximum rating for one species at one rate over all observed effects is 4. Thus, the highest rating for one rate of application on all the plant species tested is 24 (a total of 4 for each of the six plant species rated). Conversely, a rating of 6 indicates no visible effect. Those compounds which receive a rating of 10 or above are fairly active; a rating of 12 to 17 is indicative of good activity, while a rating of 18 to 24 is evidence of very high activity. The herbicidal activity ratings given in the examples which follow were based on the plants sprayed at the rate of 1 pound per acre.

Further advantages are illustrated, but are not to be construed as limited, by the following examples.

Example I.—3-propoxy-2-hydroxypropyl m-chlorophenyl arsinic acid

Meta-chlorophenyl arsonic acid and m-chlorophenyl dichloroarsine were prepared by the methods disclosed in J. Am. Chem. Soc. 44, pages 805 and 1356 (1922).

Twenty-six and four tenths grams of m-chlorophenyl-dichloroarsine were added to 140 ml. of 10 N NaOH at 25° C. To this solution, 74.4 grams of 1,2-epoxy-3-propoxypropane were added. The reaction solution was stirred at room temperature for six hours. After standing overnight, the reaction solution was heated at 55° C. for 30 minutes and cooled to room temperature. The product was isolated from the reaction solution by acidification of the organic layer which separated while standing at room temperature. The pH of the organic layer was adjusted to 3.2 with concentrated HCl. At this pH a large amount of solid precipitated from solution. The solid was removed by filtration, washed thoroughly with water and acetone and air dried. The yield amounted to 4.5 grams.

The 3-proxy-2-hydroxypropyl m-chlorophenyl arsinic acid had a melting point of 103° to 106° C., was soluble in absolute or aqueous ethanol and insoluble in acetone or cold water. It may be represented by the formula:

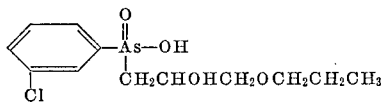

Said arsinic acid compound had a herbicidal activity rating of 17, when evaluated according to the test procedure described above.

Example II.—3-propoxy-2-hydroxypropyl o-methoxyphenyl arsinic acid

Example I was repeated using 24.4 grams of sodium o-methoxyphenylarsenite and 25.3 grams of 1,2-epoxy-3-propoxypropane and the yield amounted to 6 grams.

This 3-propoxy-2-hydroxypropyl o-methoxyphenyl arsinic acid had a melting point of 119°–212° C., was soluble in absolute or aqueous alcohol and insoluble in acetone or cold water. It may be represented by the formula:

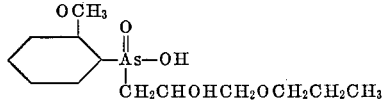

Said arsinic acid compound has a herbicidal activity rating of 22, when evaluated according to the test procedure described above. The herbicidal effect included complete defoliation of Black Valentine Beans.

Example III.—3-allyloxy-2-hydroxypropyl o-chlorophenyl arsinic acid

Example I was repeated using 26.4 grams of sodium o-chlorophenylarsenite and 34 grams of 1,2-epoxy-3-allyloxy-propane and the yield amounted to 5.9 grams.

This 3-allyloxy-2-hydroxypropyl o-chlorophenyl arsinic acid had a melting point of 124°–126° C., and was soluble in absolute or aqueous ethanol and insoluble in acetone or cold water. It may be represented by the formula:

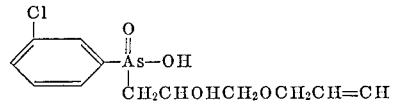

Said arsinic acid compound had a herbicidal activity rating of 12, when evaluated by the test procedure described above.

Example IV.—3-allyloxy-2-hydroxypropyl m-chlorophenyl arsinic acid

Example I was repeated using 26.4 grams of sodium m-chlorophenylarsenite and 34 grams of 1,2-epoxy-3-allyloxy-propane and the yield amounted to 6 grams.

This 3 - allyloxy - 2 - hydroxypropyl m - chlorophenyl arsinic acid had a melting point of 115°–117° C., and was soluble in absolute or aqueous ethanol and insoluble in acetone or cold water. It may be represented by the formula:

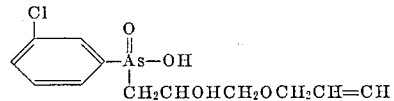

Said arsinic acid compound had a herbicidal rating of 20, when evaluated according to the test procedure described above.

Example V.—3-allyloxy-2-hydroxypropyl p-chlorophenyl arsinic acid

Example I was repeated using 26.4 grams of sodium p-chlorophenylarsenite and 34 grams of 1,2-epoxy-allyloxypropane and the yield amounted to 11 grams.

This 3-allyloxy-2-hydroxypropyl p-chlorophenyl arsinic acid had a melting point of 114°–117° C., was soluble in absolute or aqueous ethanol and insoluble in acetone or cold water. It may be represented by the formula:

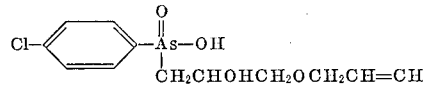

Said arsinic acid compound had a herbicidal activity rating of 18, when evaluated according to the test procedure described above.

Example VI.—3-allyloxy-2-hydroxypropyl o-methoxyphenyl arsinic acid

Example I was repeated using 24.4 grams of sodium o-methoxyphenylarsenite and 34 grams of 1,2-epoxy-3-allyloxypropane and the yield amounted to 6.5 grams.

This 3 - allyloxy - 2-hydroxypropyl o-methoxyphenyl arsinic acid had a melting point of 118°–119° C., was soluble in absolute or aqueous alcohol and insoluble in acetone or cold water. It may be represented by the formula:

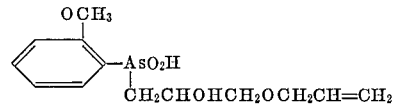

Said arsinic acid compound had a herbicidal activity rating of 20, when evaluated by the test procedure described above.

Example VII.—3-allyloxy-2-hydroxypropyl p-methoxyphenyl arsinic acid

Example I was repeated using 24.4 grams of sodium p-methoxyphenylarsenite and 34 grams of 1,2-epoxy-3-allyloxypropane and the yield amounted to 11 grams.

This 3 - allyloxy - 2 - hydroxypropyl p-methoxyphenyl arsinic acid had a melting point of 112°–115° C., was soluble in absolute or aqueous alcohol and insoluble in acetone or cold water. It may be represented by the formula:

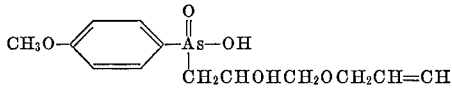

Said arsinic acid compound had a herbicidal activity rating of 23, when evaluated according to the test procedure described above. It caused complete defoliation of the Black Valentine Beans.

Example VIII.—3-(2-propynyloxy)-2-hydroxypropyl m-chlorophenyl arsinic acid

Example I was repeated using 26.4 grams of sodium m-chlorophenylarsenite and 33.6 grams of 1,2-epoxy-3-propynyloxypropane and the yield amounted to 6 grams.

This 3 - (2 - propynyloxy)-2-hydroxypropyl m-chlorophenyl arsinic acid had a melting point of 110°–113° C., was soluble in absolute or aqueous alcohol and insoluble in acetone or cold water. It may be represented by the formula:

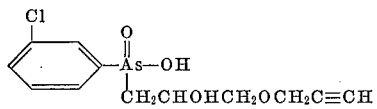

Said arsinic acid compound had a herbicidal activity rating of 19, when evaluated by the test procedure described above.

Example IX.—3-(2-propynyloxy)-2-hydroxypropyl p-chlorophenyl arsinic acid

Example I was repeated using 26.4 grams of sodium p-chlorophenylarsenite and 33.6 grams of 1,2-epoxy-3-propynyloxypropane and the yield amounted to 10 grams.

This 3 - (2 - propynyloxy)-2-hydroxypropyl p-chlorophenyl arsinic acid had a melting point of 131°–133° C., was soluble in absolute or aqueous alcohol and insoluble in acetone or cold water. It may be represented by the formula:

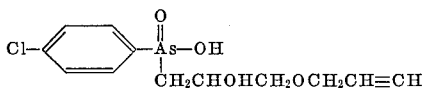

Said arsinic acid compound had a herbicidal activity rating of 23, when evaluated according to the test procedure described above.

Example X.—3-(2-propynyloxy)-2-hydroxypropyl o-methoxyphenyl arsinic acid

Example I was repeated using 24.4 grams of sodium o-methoxyphenylarsenite and 33.6 grams of 1,2-epoxy-3-propynyloxypropane and the yield amounted to 4 grams.

This 3 - (2-propynyloxy)-2-hydroxypropyl o-methoxyphenyl arsinic acid had a melting point of 118°–119° C., was soluble in absolute or aqueous alcohol and insoluble in acetone or cold water. It may be represented by the formula:

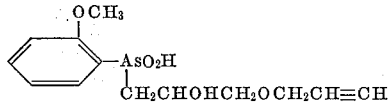

Said arsinic acid compound had a herbicidal activity rating of 21, when evaluated according to the test procedure described above.

Example XI.—3-phenoxy-2-hydroxypropyl phenyl arsinic acid

Example I was repeated using 23 grams of sodium phenylarsenite and 45 grams of 1,2-epoxy-3-phenoxypropane and the yield amounted to 7 grams.

This 3-phenoxy-2-hydroxypropylphenyl arsinic acid had a melting point of 151°–152° C., was soluble in absolute or aqueous ethanol and insoluble in acetone or cold water. It may be represented by the formula:

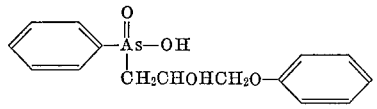

Said arsinic acid compound had a herbicidal activity rating of 12, when evaluated according to the test procedure described above.

Example XII.—3-phenoxy-2-hydroxypropyl m-chlorophenyl arsinic acid

Example I was repeated using 26.4 grams of sodium m-chlorophenylarsenite and 45 grams of 1,2-epoxy-3-phenoxypropane and the yield amounted to 13.5 grams.

This 3-phenoxy-2-hydroxypropyl m-chlorophenyl arsinic acid had a melting point of 151°–153° C., was soluble in absolute or aqueous ethanol and insoluble in acetone or cold water. It may be represented by the formula:

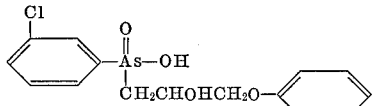

Said arsinic acid compound had a herbidical activity rating of 17, when evaluated according to the test procedure described above.

Example XIII.—3-phenoxy-2-hydroxypropyl o-methoxyphenyl arsinic acid

Example I was repeated using 24.4 grams of sodium o-methoxyphenylarsenite and 45 grams of 1,2-epoxy-3-phenoxy propane and the yield amounted to 18 grams.

This 3-phenoxy-2-hydroxypropyl o-methoxyphenyl arsinic acid had a melting point of 149° to 152° C., was soluble in absolute or aqueous ethanol and insoluble in acetone or cold water. It may be represented by the formula:

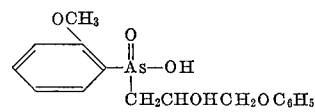

Said arsinic acid compound had a herbicidal activity rating of 18, when evaluated according to the test procedure given above.

Example XIV.—3-(2,4-dichlorophenoxy)-2-hydroxypropyl m-chlorophenyl arsinic acid Example I was repeated using 26.4 grams of sodium m-chlorophenylarsenite and 65.7 grams of 1,2-epoxy-3-(2,4-dichlorophenoxy)propane and the yield amounted to 4 grams.

This 3-(2,4-dichlorophenoxy)-2-hydroxypropyl m-chlorophenyl arsinic acid had a melting point of 176°–179° C., was soluble in absolute or aqueous ethanol and insoluble in acetone or water. It may be represented by the formula:

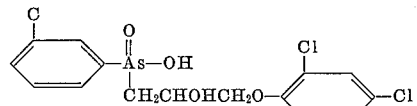

Said arsinic acid compound had a herbicidal activity rating of 18, when evaluated according to the test procedure described above.

Example XV.—3-(2,4-dichlorophenoxy)-2-hydroxypropyl p-chlorophenyl arsinic acid

Example I was repeated using 26.4 grams of sodium p-chlorophenylarsenite and 65.7 grams of 1,2-epoxy-3-

(2,4-dichlorophenoxy)propane and the yield amounted to 17 grams.

This 3-(2,4-dichlorophenoxy)-2-hydroxypropyl p-chlorophenyl arsinic acid had a melting point of 132°–134° C., was soluble in absolute or aqueous ethanol and insoluble in acetone or cold water. It may be represented by the formula:

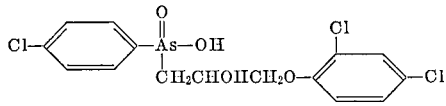

Said arsinic acid compound had a herbicidal activity rating of 16, when evaluated according to the test procedure described above.

Example XVI.—3-(2,4-dichlorophenoxy)-2-hydroxypropyl o-methoxyphenyl arsinic acid Example I was repeated using 24.4 grams of sodium o-methoxyphenyl arsenite and 65.7 grams of 1,2-epoxy-3-(2,4-dichlorophenoxy)propane and the yield amounted to 7 grams.

This 3-(2,4-dichlorophenoxy)-2-hydroxypropyl o-methoxyphenyl arsinic acid had a melting point of 199°–203° C., was soluble in absolute or aqueous ethanol and insoluble in acetone or cold water. It may be represented by the formula:

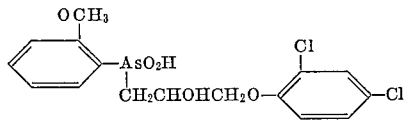

Said arsinic acid compound had a herbicidal activity rating of 14, when evaluated according to the test procedure described above.

Various modifications and variations of this invention will be obvious to a worker skilled in the art.

We claim:
1. Aryl hydroxyalkyl arsinic acid compounds having the general formula:

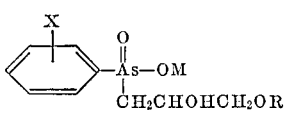

wherein X represents a member selected from the group consisting of hydrogen, chlorine and methoxy radicals; wherein R represents a member selected from the group consisting of phenyl, propyl, allyl, 2-propynyl and 2,4-dichlorophenyl radicals and M represents a member selected from the group consisting of hydrogen, an alkali metal, an alkaline earth metal, an ammonium ion and an amine salt moiety.

2. Aryl hydroxyalkyl arsinic acid compounds according to claim 1, wherein R represents a phenyl radical.

3. Aryl hydroxyalkyl arsinic acid compounds according to claim 1, wherein R represents a propyl radical.

4. Aryl hydroxyalkyl arsinic acid compounds according to claim 1, wherein R represents an allyl radical.

5. Aryl hydroxyalkyl arsinic acid compounds according to claim 1, wherein R represents a 2-propynyl radical.

6. Aryl hydroxyalkyl arsinic acid compounds according to claim 1, wherein R represents a 2,4-dichlorophenyl radical.

7. Aryl hydroxyalkyl arsinic acid compounds according to claim 1, wherein X represents a methoxy radical and R represents a propyl radical.

8. Aryl hydroxyalkyl arsinic acid compounds according to claim 1, wherein X represents chlorine and R represents a 2-propynyl radical.

9. Aryl hydroxyalkyl arsinic acid compounds according to claim 1, wherein X represents a methoxy radical and R represents a 2-propynyl radical.

10. Aryl hydroxyalkyl arsinic acid compounds according to claim 1, wherein X represents chlorine and R represents an allyl radical.

11. Aryl hydroxyalkyl arsinic acid compounds according to claim 1, wherein X represents chlorine and R represents a 2,4-dichlorophenyl radical.

References Cited

UNITED STATES PATENTS

| | | | |
|---|---|---|---|
| 2,312,207 | 2/1943 | Clayton et al. | 260—440 X |
| 2,346,155 | 4/1944 | Denison et al. | 260—440 X |
| 2,701,812 | 2/1955 | Takahaski | 260—440 |
| 3,322,805 | 5/1967 | Schanhals | 260—440 |

HELEN M. McCARTHY, Primary Examiner.

W. F. W. BELLAMY, Assistant Examiner.

U.S. Cl. X.R.

260—440, 271; 71—82, 83, 97